3,140,320
**PROCESS FOR PREPARING PENTA-
FLUOROIODOETHANE**
Viktor Weinmayr, Landenberg, Pa., assignor to E. I.
du Pont de Nemours and Company, Wilmington, Del.,
a corporation of Delaware
No Drawing. Filed May 23, 1961, Ser. No. 111,912
8 Claims. (Cl. 260—653.6)

This invention relates to a new and improved process for preparing pentafluoroiodoethane and particularly for preparing such compound in high yields and high purity.

Pentafluoroiodoethane is known to be an important intermediate for the preparation of fluorocarbon compounds. It can be reacted with olefines or fluoroolefines to give higher molecular weight alkyliodides, or with metals, such as mercury, to give fluorine-containing metal compounds which are useful as polymerization initiators.

A number of methods for the preparation of pentafluoroiodoethane are described in "Fluorine Chemistry," J. H. Simons, ed., vol. II, pp. 366, Academic Press, N.Y., 1954. Two of these methods describe the reaction of tetrafluoroethylene with iodine pentafluoride at 170° C.–250° C. (See also J. H. Simons and T. J. Brice, U.S. Patent No. 2,614,131.) Another method described is the reaction of fluoroalkyl mercurials with iodine under the influence or ultraviolet light or heat.

These methods have certain drawbacks which make their application to large scale manufacture of pentafluoroiodoethane unattractive. Iodine pentafluoride must be made from iodine and fluorine, and its use is nearly as hazardous as that of elemental fluorine. On the other hand, the manufacture and handling of the volatile and very toxic fluoroalkyl mercurials are equally undesirable.

It is an object of this invention to provide a new and improved process for preparing pentafluoroiodoethane. Another object is to provide a process for preparing pentafluoroiodoethane of exceptional purity in high yields. A further object is to provide a process for preparing pentafluoroiodoethane in a relatively safe and convenient manner from readily available starting materials. A still further object is to advance the art. Still other objects will appear hereinafter.

The above and other objects may be accomplished in accord with this invention which comprises mixing at a temperature below about 30° C. mercuric oxide, liquid hydrogen fluoride, iodine and tetrafluoroethylene in the ratio of from about 0.5 to about 1.5 mole of iodine and from about 0.5 to about 0.7 mole of mercuric oxide for each mole of tetrafluoroethylene and at least 4.1 moles of hydrogen fluoride for each mole of mercuric oxide, then heating the mixture in a closed vessel at a temperature of from about 25° C. to about 150° C. under autogenous pressure, and recovering pentafluoroiodoethane from the reaction mixture.

It has been found that, by the process of this invention, pentafluoroiodoethane of exceptional purity is readily obtained in high yields, the starting materials are readily available, and their use in the process does not present the hazards involved in prior known processes. The reaction appears to be specific, giving pentafluoroiodoethane as the product. Polymerization of the tetrafluoroethylene does not occur. The tetrafluoroethylene is absorbed quickly at 5° C. to 15° C. when added to a slurry of mercuric oxide and iodine in hydrogen fluoride, and pentafluoroiodoethane is obtained in good yield even when the temperature does not exceed 25° C. Tetrafluoroethylene does not react with mercuric oxide in hydrogen fluoride to produuce bis(pentafluoroethyl)mercury or with iodine in hydrogen fluoride to form tetrafluorodiiodoethane at such low temperatures. Also, the pentafluoroiodoethane does not couple with the tetrafluoroethylene to form higher molecular weight fluoroalkyliodides under the conditions of this process.

The tetrafluoroethylene employed preferably will be the commercial tetrafluoroethylene which contains a polymerization inhibitor, usually Terpene B, and, except where specifically indicated otherwise, such tetrafluoroethylene was employed in the examples given hereinafter. This is primarily a matter of convenience and safety. Additional polymerization inhibitors such as hydroquinone and phenothiazine may be added to the reaction mass so as to further ensure against any possible polymerization of the tetrafluoroethylene. The presence of the polymerization inhibitor does not affect the reactivity of the tetrafluoroethylene in the process or affect the yields or the quality of the desired product. The presence of a polymerization inhibitor is not essential and the process can be carried out satisfactorily in the absence of a polymerization inhibitor.

The iodine employed will be elemental iodine and conveniently will be commercially available technical iodine. The iodine may be employed in a proportion of from about 0.5 to about 1.5 moles per mole of tetrafluoroethylene. Materially smaller amounts of iodine result in a decrease in yields, and larger amounts are wasteful. The preferred amounts of iodine will be from about 0.9 to about 1.25 moles per mole of tetrafluoroethylene.

Technical yellow or red mercuric oxide is satisfactory for use in the reaction. Mercuric iodide is formed in the course of the reaction and may be converted back to mercuric oxide and reused in the process. The fact that mercuric iodide is inert in hydrofluoric acid, not being converted to mercuric fluoride and hydrogen iodide, is of great advantage in the process of this invention in that pentafluoroiodoethane of exceptional purity is obtained. The by-product mercuric iodide may be converted to mercuric oxide and iodine by known means, as described by E. Boll in Sueddeutsche Apotheker Zeitung, 88, No. 16, 453 (1948), whereby the mercuric iodide is oxidized in a hydrochloric acid slurry to iodine and mercuric chloride. Mercuric oxide is precipitated from the mercuric chloride solution with an alkali, such as sodium hydroxide. The iodine, obtained as a by-product in the recovery of mercuric oxide, may be reused in the manufacture of pentafluoroiodoethane.

Theoretically, the reaction requires 0.5 mole of mercuric oxide for each mole of tetrafluoroethylene. In the process of this invention there may be used from about 0.5 to about 0.7 mole of mercuric oxide for each mole of tetrafluoroethylene.

The hydrogen fluoride, which is mixed with the mercuric oxide, the iodine, and the tetrafluoroethylene, preferably should be anhydrous technical hydrogen fluoride. In the course of the process, 2 moles of hydrogen fluoride react with each mole of the mercuric oxide to form 1 mole of water. Hydrogen fluoride, in excess of such 2 moles, dissolves in that water to form hydrofluoric acid. It has been found that, in the process of this invention, the concentration of the resulting hydrofluoric acid should not be less than 70% HF. Greater dilution produces unfavorable reaction conditions, with the result that the desired product is not formed. For example, the desired reaction does not take place when hydrogen fluoride gas is passed into and through a suspension of mercuric oxide in the reactant at atmospheric pressure, such procedure resulting in hydrofluoric acid having a concentration of not more than 50% HF.

The minimum amount of hydrogen fluoride, which can be used in the process of this invention, is that which produces a hydrofluoric acid concentration of at least 70%, which requires at least 4.1 moles of hydrogen fluoride for each mole of mercuric oxide present. Usually, at least 6 moles of hydrogen fluoride will be used. There does not appear to be any upper limit to the amount of hydrogen fluoride which can be employed, but for practical, economic reasons, not more than about 40 moles of hydrogen fluoride will be employed ordinarily for each mole of mercuric oxide. Generally, it is preferred to employ from about 20 to about 35 moles of hydrogen fluoride for each mole of mercuric oxide.

It is essential that the mercuric oxide, iodine, liquid hydrogen fluoride, and the tetrafluoroethylene be mixed at a temperature below about 30° C., preferably below 25° C., and then heated to the desired reaction temperature in a closed vessel under autogenous pressure. The temperature of mixing may be as low as —50° C., but preferably is from about 5° C. to about 20° C. While the reaction may be allowed to proceed at about 20° C. to about 25° C. with good yields, the reaction requires about 20 to about 24 hours for completion at such temperatures. In order to accelerate the reaction and complete it in a reasonably short period of time, the mixture is heated preferably to from about 50° C. to about 125° C. Higher temperatures, up to about 150° C. or even 200° C., are not harmful, but offer no advantage. The pressures, which are the autogenous pressures, will vary from about 30 to about 1,000 p.s.i.g. and from about 30 to about 500 p.s.i.g. at the preferred reaction temperatures. A preferred and most convenient procedure for carrying out the reaction is to form a slurry of iodine and mercuric oxide in liquid hydogen fluoride in a pressure vessel and then gradually add the tetrafluoroethylene thereto while maintaining the temperature at the desired low mixing temperature and, when the addition of the tetrafluoroethylene has been completed, heat the mixture gradually to the desired reaction temperature.

The pentafluoroiodoethane can be recovered from the reaction mass by any conventional procedure. Conveniently, the reaction mass will be cooled to about 25° C. to about 30° C., the pentafluoroiodoethane (B.P. 13° C.) will be distilled from the reaction mass and the vapors thereof passed through water or an aqueous alkali solution to remove traces of hydrogen fluoride, dried, and condensed. Thereby, the pentafluoroiodoethane is obtained usually in a purity of at least 99.5%, particularly when the process is conducted under the preferred conditions.

In order to illustrate this invention, preferred modes of practicing it, and the advantageous results to be obtained thereby, the following examples are given in which the parts and proportions are by weight, except where specifically indicated otherwise.

*Example 1*

A stainless steel autoclave was charged with 216 parts of technical yellow mercuric oxide, 508 parts of iodine, 0.2 part of hydroquinone and 0.2 part of phenothiazine. The reactor was cooled to about 0° C., and 550 parts of technical anhydrous hydrogen fluoride, previously cooled to 0° C., were added. Moderate cooling was continued while 208 parts of tetrafluoroethylene were added over a period of approximately one hour as follows: 60 parts of tetrafluoroethylene were added, causing the temperature to rise to 8° C. and the pressure to rise to 100 p.s.i.g. The pressure dropped to 30 p.s.i.g. within 15 minutes, and 75 parts of tetrafluoroethylene were again added. The pressure rose to 180 p.s.i.g. at 14° C., and dropped to 60 p.s.i.g. within 45 minutes The remaining 75 parts of tetrafluoroethylene were added at 6° C. and the pressure rose to 180 p.s.i.g. After the pressure had dropped to 120 p.s.i.g. within 15 minutes, heating of the charge was started. A temperature of 119° C. was reached after four hours and was maintained for one hour. The pressure of 440 p.s.i.g recorded at that temperature did not change during the period of one hour. The charge was then cooled to 20° C. where a pressure of 58 p.s.i.g. was registered. The charge was maintained at 20° C.–25° C. while the pentafluoroiodoethane (B.P. 13° C.) was distilled from it. The gas was passed through a water scrubber maintained at 20° C.–25° C., then through a tube charged with a drying agent, and condensed in a vessel maintained at about —40° C. to —20° C. This condensed readily all the pentafloroiodoethane and permitted the unreacted tetrafluoroethylene (B.P. —76° C.) to pass on uncondensed.

432 parts of pentafluoroiodoethane were obtained, equal to a yield of 87.9% of theory based on the amount of mercuric oxide and iodine charged. The product was 99.6% pure by mass spectrometric analysis.

The contents of the autoclave were discharged into about 3000 parts of cold water and the mercuric iodide which precipitated was filtered, washed free of acid, and dried. 449 parts of 100% mercuric iodide were obtained equal to a recovery of mercury and iodine of 99% of theory. Iodine and mercuric oxide were readily recovered from it in nearly quantitative yields by known methods as for instance, oxidation with nitrous acid to liberate the iodine, and treatment with sodium hydroxide to precipitate the mercuric oxide. Both the regenerated iodine and mercuric oxide could be used in place of fresh starting materials, as in the following Example 2.

*Example 2*

A pressure bomb was charged with 73 parts of mercuric oxide, recovered from mercuric iodide, and 12 parts of fresh mercuric oxide. Then 77 parts of iodine, recovered from mercuric iodide, and 114 parts of fresh iodine, as well as 0.2 part of hydroquinone and 0.2 part of phenothiazine were added. The bomb was cooled in a Dry Ice and acetone mixture and 200 parts of hydrogen fluoride and 85 parts of tetrafluoroethylene were added. The bomb was agitated while the temperature of the charge was raised to 50° C. in two hours, maintained at 50° C. for two hours, then raised to 125° C. in two hours and maintained at 125° C. for three hours.

166 parts of pentafluoroiodoethane were obtained with a purity of 99.7% and a yield of 86.0% based on the amount of mercuric oxide used. 177 parts of mercuric iodide equal to 99% of theory were recovered.

*Example 3*

A bomb was charged with 81 parts of mercuric oxide, 191 parts of iodine, and 180 parts of hydrogen fluoride. (Hydroquinone and phenothiazine were not added to this charge.) 60 parts of tetrafluoroethylene were passed through silica gel to remove the polymerization inhibitor contained in technical tetrafluoroethylene, and then condensed under pressure into the bomb which was cooled in a Dry Ice and acetone mixture. The temperature of the well agitated charge was raised to 125° C. over a period of four hours and was maintained at 125° C. for two hours. 167 parts of pentafluoroiodoethane were obtained with a purity of 99.5% and a yield of 91.2% of theory based on mercuric oxide.

*Example 4*

A shaker bomb was charged with 81 parts mercuric oxide, 63 parts of iodine, and 180 parts of hydrogen fluoride. The bomb was cooled in a Dry Ice and acetone mixture. 55 parts of tetrafluoroethylene (freed of polymerization inhibitor as in Example 3) were added at about 0° C. The charge was heated to 125° C. over a period of about four hours, and agitated at 125° C. for four hours. Pentafluoroiodoethane was distilled from the reaction mass at 20° C.–30° C. and 34 parts of 90% pure product were obtained, corresponding to a yield of 55% based on the amount of iodine used. The 10% impurities consisted of a number of unidentified products.

When 95 parts of iodine were used in a similar charge, the yield of 94% pure pentafluoroiodoethane was 62% based on the amount of iodine charged.

Example 5

270 parts of mercuric oxide, 698 parts of iodine, 1 part of hydroquinone, and 1 part of phenothiazine were put into an autoclave and 650 parts of hydrogen fluoride were added. Since no cooling was used, the temperature in the autoclave rose to 30° C. upon the addition of the hydrogen fluoride. 275 parts of tetrafluoroethylene were then added at 10° C.–15° C. in about 5 equal parts over a period of two hours. Then the charge temperature was brought to 50° C. and maintained at 50° C.–55° C. for five hours. Then the temperature was raised to 125° C. in three hours and kept at 125° C. for three hours.

Upon the usual distillation, 478 parts of pentafluoroiodoethane of a purity of 97.6% was obtained, equal to a yield of 77.8% based on the amount of mercuric oxide charged. 509 parts of mercuric iodide, containing free iodine, were recovered.

Example 6

54 parts of mercuric oxide, 127 parts of iodine, 0.2 part of hydroquinone and 0.2 part of phenothiazine were put into a shaker bomb and cooled in a Dry Ice-acetone bath. 180 parts of hydrogen fluoride cooled to 0° C. were added, followed by 55 parts of tetrafluoroethylene. The reaction mass was agitated at 20° C.–25° C. for 20 hours. Upon distillation, 90 parts of pentafluoroiodoethane was obtained, equal to a yield of 72.2% based on the mercuric oxide.

Example 7

A charge of 54 parts of mercuric oxide, 127 parts of iodine, 0.2 part of hydroquinone, 0.2 part of phenothiazine and 60 parts of water was cooled in a Dry Ice-acetone bath, and 180 parts of anhydrous hydrogen fluoride were added. This produced an aqueous hydrofluoric acid of a 75% hydrogen fluoride strength. 55 parts of tetrafluoroethylene were added, the charge was heated to 125° C. in four hours, and agitated at that temperature for six hours. Upon distillation, 26 parts of pentafluoroiodoethane were obtained equal to a yield of 21% based on the mercuric oxide.

When a 50% aqueous hydrofluoric acid was used under identical conditions, no measurable yield of pentafluoroiodoethane was obtained.

Example 8

A shaker bomb, cooled in a Dry Ice and acetone mixture, was charged with 54 parts of mercuric oxide, 30 parts of hydrogen fluoride, 127 parts of iodine, 0.2 part of hydroquinone, 0.2 part of phenothiazine and 50 parts of tetrafluoroethylene. The charge was heated to 125° C. over a period of four hours, and maintained at 125° C. for two hours. Upon the usual isolation by distillation, 59 parts of pentafluoroiodoethane, equal to a yield of 38.4% based on the mercuric oxide, were obtained. No doubt, if it had been possible to mill the charge during the heating period, a more complete reaction would have been obtained.

Example 9

A mixture of 54 parts of mercuric oxide, 127 parts of iodine, 180 parts of hydrogen fluoride, 0.2 part of hydroquinone and 0.2 part of phenothiazine was raised to 125° C. over a period of two hours and was held at 125° C. for two hours. It was thereafter cooled to 0° C., and 55 parts of tetrafluoroethylene were added. The temperature of the charge was raised to 125° C. in two hours and held at 125° C. for two hours. 50 parts of pentafluoroiodoethane of a purity of 96.0% was obtained upon the usual isolation by distillation, equal to a yield of 39% based on the mercuric oxide.

Example 10

An autoclave was charged with 117 parts of iodine, 0.1 part of hydroquinone, 0.1 part of phenothiazine, and 116 parts of anhydrous hydrogen fluoride. Agitation was started and the mixture cooled to 0° C. 51.7 parts of mercuric oxide were added at such a rate that the temperature did not rise above 10° C. 50 parts of tetrafluoroethylene were added in 3 portions at about 10° C. in about 2 hours. Agitation was continued for an hour without further cooling and then the charge was heated to 75° C. in about 2 hours and agitated at 75° C. for four hours. 100 parts of pentafluoroiodoethane were obtained (85% yield).

The variations in the reaction conditions as illustrated by the examples are tabulated below.

| Example | Moles HF | Moles HgO | Moles $CF_2CF_2$ | Moles $I_2$ | Reaction Temp., ° C | Percent Yield Based on HgO |
|---|---|---|---|---|---|---|
| 1 | 27.5 | 1 | 2.08 | 2 | 119 | 87.9 |
| 2 | 10 | 0.4 | 0.85 | 0.75 | 50–125 | 86.0 |
| 3 | 9 | 0.375 | 0.60 | 0.75 | 125 | 91.2 |
| 4 | 9 | 0.375 | 0.55 | 0.25 | 125 | ¹55 |
| 5 | 32.5 | 1.25 | 2.75 | 2.75 | 50–125 | 77.8 |
| 6 | 9 | 0.25 | 0.55 | 0.5 | 20–25 | 72.2 |
| 7 | 9 | 0.25 | 0.55 | 0.5 | 125 | 21 |
| 8 | 1.5 | 0.25 | 0.50 | 0.5 | 125 | 38.4 |
| 9 | 9 | 0.25 | 0.55 | 0.5 | 125 | 39 |
| 10 | 5.8 | 0.24 | 0.50 | 0.46 | 75 | 85 |

¹ Based on $I_2$

It will be understood that the preceding examples are given for illustrative purposes solely and that this invention is not limited to the specific embodiments described therein. On the other hand, it will be readily apparent to those skilled in the art that, subject to the limitations set forth in the general description, many variations and modifications can be made in the proportions, conditions, and techniques employed without departing from the spirit or scope of this invention.

From the preceding description, it will be apparent that this invention provides a new and improved process for preparing pentafluoroiodoethane in high yields and high purity from readily available starting materials. The process is simple and readily carried out and avoids the hazards involved in prior processes. Also, the process avoids side reactions which would consume starting material and desired products and produce undesired by-products. Therefore, it will be apparent that this invention constitutes a valuable advance in and contribution to the art.

The embodiments of the invention in which an exclusive property or privilege is claimed are defined as follows:

1. The process for preparing pentafluoroiodoethane which comprises mixing at a temperature below about 30° C. mercuric oxide, liquid hydrogen fluoride, iodine and tetrafluoroethylene in the ratio of from about 0.5 to about 1.5 moles of iodine and from about 0.5 to about 0.7 mole of mercuric oxide for each mole of tetrafluoroethylene and at least 4.1 moles of hydrogen fluoride for each mole of mercuric oxide, then heating the mixture in a closed vessel at a temperature of from about 25° C. to about 150° C. under autogenous pressure, and recovering pentafluoroiodoethane from the reaction mixture.

2. The process for preparing pentafluoroiodoethane which comprises mixing at a temperature below about 30° C. mercuric oxide, liquid hydrogen fluoride, iodine and tetrafluoroethylene in the ratio of from about 0.5 to about 1.5 mole of iodine and from about 0.5 to about 0.7 mole of mercuric oxide for each mole of tetrafluoroethylene and from 4.1 to about 40 moles of hydrogen fluoride for each mole of mercuric oxide, then heating the mixture in a closed vessel at a temperature of from about 25° C. to about 150° C. under autogenous pressure, and recovering pentafluoroiodoethane from the reaction mixture.

3. The process for preparing pentafluoroiodoethane which comprises mixing at a temperature below about 30° C. mercuric oxide, liquid hydrogen fluoride, iodine and tetrafluoroethylene in the ratio of from about 0.5 to about 1.5 moles of iodine and from about 0.5 to about 0.7 mole of mercuric oxide for each mole of tetrafluoroethylene and from 4.1 to about 40 moles of hydrogen fluoride for each mole of mercuric oxide, then heating the mixture in a closed vessel at a temperature of from about 50° C. to about 150° C. under autogenous pressure, and recovering pentafluoroiodoethane from the reaction mixture.

4. The process for preparing pentafluoroiodoethane which comprises mixing at a temperature below about 30° C. mercuric oxide, liquid hydrogen fluoride, iodine and tetrafluoroethylene in the ratio of from about 0.5 to about 1.5 moles of iodine and from about 0.5 to about 0.7 mole of mercuric oxide for each mole of tetrafluoroethylene and from about 20 to about 35 moles of hydrogen fluoride for each mole of mercuric oxide, then heating the mixture in a closed vessel at a temperature of from about 50° C. to about 125° C. under autogenous pressure, and recovering pentafluoroiodoethane from the reaction mixture.

5. The process for preparing pentafluoroiodoethane which comprises mixing at a temperature below about 30° C. mercuric oxide, liquid hydrogen fluoride, iodine and tetrafluoroethylene in the ratio of from about 0.9 to about 1.25 moles of iodine and from about 0.5 to about 0.7 mole of mercuric oxide for each mole of tetrafluoroethylene and from about 20 to about 35 moles of hydrogen fluoride for each mole of mercuric oxide, then heating the mixture in a closed vessel at a temperature of from about 50° C. to about 125° C. under autogenous pressure, and recovering pentafluoroiodoethane from the reaction mixture.

6. The process for preparing pentafluoroiodoethane which comprises gradually adding tetrafluoroethylene to a slurry of iodine and mercuric oxide in liquid hydrogen fluoride in a ratio of from about 0.5 to about 1.5 moles of iodine and from about 0.5 to about 0.7 mole of mercuric oxide for each mole of tetrafluoroethylene and at least 4.1 moles of hydrogen fluoride for each mole of mercuric oxide while maintaining a temperature below about 30° C., then heating the mixture in a closed vessel at a temperature of from about 25° C. to about 150° C. under autogenous pressure, and recovering pentafluoroiodoethane from the reaction mixture.

7. The process for preparing pentafluoroiodoethane which comprises gradually adding tetrafluoroethylene to a slurry of iodine and mercuric oxide in liquid hydrogen fluoride in a ratio of from about 0.5 to about 1.5 moles of iodine and from about 0.5 to about 0.7 mole of mercuric oxide for each mole of tetrafluoroethylene and from 4.1 to about 40 moles of hydrogen fluoride for each mole of mercuric oxide, while maintaining a temperature below about 30° C., then heating the mixture in a closed vessel at a temperature of from about 50° C. to about 150° C. under autogenous pressure, and recovering pentafluoroiodoethane from the reaction mixture.

8. The process for preparing pentafluoroiodoethane which comprises gradually adding tetrafluoroethylene to a slurry of iodine and mercuric oxide in liquid hydrogen fluoride in a ratio of from about 0.9 to about 1.25 moles of iodine and from about 0.5 to about 0.7 mole of mercuric oxide for each mole of tetrafluoroethylene and from about 20 to about 35 moles of hydrogen fluoride for each mole of mercuric oxide, while maintaining a temperature below about 30° C., then heating the mixture in a closed vessel at a temperature of from about 50° C. to about 125° C. under autogenous pressure, and recovering pentafluoroiodoethane from the reaction mixture.

References Cited in the file of this patent

UNITED STATES PATENTS

| | | |
|---|---|---|
| 2,424,667 | Raasch | July 29, 1947 |
| 2,552,263 | Dickey | May 8, 1951 |